United States Patent Office 3,503,761
Patented Mar. 31, 1970

3,503,761
AEROSOL SHOE POLISH
Francis J. Schumacher, Elgin, Ill., assignor to
Leo J. Fregeau, La Grange, Ill.
No Drawing. Filed May 25, 1967, Ser. No. 641,137
Int. Cl. C08h 9/00; C09f; C09g
U.S. Cl. 106—8                              4 Claims

ABSTRACT OF THE DISCLOSURE

This invention provides an aerosol wax polish composition consisting of a non-aqueous solution of wax concentrate in a chlorinated hydrocarbon solvent, said solution of concentrate being dispersed in a liquefied dichlorodifluoromethane propellant, the ratio of concentrate to propellant being from about 35:65 to about 65:35 percent by weight and the concentrate including a mixture of a montan derivative wax and a de-oiled lanolin derivative in a ratio of about 1:3 to about 2:5 percent, respectively by weight, said concentrate also including a dye component solution in the same chlorinated hydrocarbon solvent; said dye solution being about 2% by weight and said dye component being present in the concentrate in an amount ranging from .1% to .3% by weight of total concentrate and said chlorinated solvent being present in a range of 95% to 98% by weight of total concentrate. A novel method of producing the aerosol wax composition also is provided comprising the steps of first melting the wax-lanolin derivative mixture and step-wise addition of chlorinated solvent with agitation to form a concentrate solution, said dye component solution being added with the addition of the solvent subsequent to filtration of the dye component solution, the total amount of solvent being calculated from both the wax-lanolin derivative solution and the dye solution, with solvent lost by evaporation during the mixing stage being added to bring the total solvent to the desired proportional amount. The thus prepared concentrate solution is dispersed in the liquefied propellant under pressure and packaged in pressurized packages by means of conventional aerosol packaging technique.

---

This invention relates generally to sprayable wax polish compositions and more particularly, is concerned with the provision of a new and useful non-aqueous aerosol wax polish composition especially adapted for application from an automatic shoe shine dispensing vending machine.

Generally, aerosol spray techniques have been adapted for use in many different fields to apply coatings of a variety of materials. Such compositions employ one or more of a plurality of haloalkanes, usually in their liquefied state, packaged under pressure, as both the propellant and the solvent for the material to be dispensed. Such "aerosol technique" has been applied to the dispensing of liquid waxes or solutions of waxes. In view of the increasing public acceptability of automatic machines for dispensing of shoe shines, the desirability of a self-sprayable wax polish composition which could be used in such machines is evident. A number of efforts have been made to form self propellant wax polish compositions but a truly satisfactory aerosol wax polish composition for such usage has not been available.

One serious disadvantage in the dispensing of wax polish composition using aerosol technique is the inability of the waxes of the hard finish variety to dissolve in the propellant. When such solid waxes are formed into dispersions and mixed with the liquefied propellants, the resulting mixtures tend to agglomerate, increasing in particle size, and separate from the propellant to result in either clogging of the aerosol spray valve or the failure of the aerosol to deliver the desired amount of wax. Efforts to alleviate the problem of agglomeration usually were directed either to the inclusion of specialized emulsifying agents or surface active agents, or, to the use of waxes other than the so-called hard type waxes such as carnauba waxes, montan waxes, and other microcrystalline waxes which, when buffed, result in hard, high-lustre finishes most desirable for application to leather. Often, these specialized agents or substitute waxes tend slowly to evaporate from the sprayed coating, delaying the buffing operation or resulting in soft, lack-lustre finishes.

Another approach to the problem of providing aerosol wax polish compositions principally provided water-in-oil type emulsions which have a relatively high water content. Such products have the undesirable tendencies to corrode the container during storage, to produce a spray in the form of an undesirable foam, to produce a coating which is powdery and fails to adhere to the treated surface so that it is quick to be brushed off during buffing, and to produce a coating on the sprayed surface in which material remains as residue other than the waxy composition, therefor making buffing awkward and unsatisfactory as to the finish obtained. High water content is undesirable in view of a slow rate of evaporation, thus rendering compositions of this type unsuitable for use in vending machine applications.

Of course, for the specific application principally concerned herein, that is, the application of a polish coating from a machine designed automatically to operate in a first cycle of application and a next cycle of buffing of said coating, an aerosol wax polish composition must be possessed of the following qualities: non-flammability; resistance to agglomeration and attendant increase in particle size; non-clogging of the aerosol spray valve; affinity of the wax components of the sprayed coating for the treated leather surface during buffing; elimination of any need for the use of specialized stripping agents prior to reapplication; chemical compatibility of the components, both wax, solvent, dispersant or other component with the treated surface material, so as not to damage same; and, likewise as important, compatibility with the cyclic operation of the machine. The last mentioned characteristic is very important. The applied coating must dry prior to the buffing cycle. If the coating is not dry, the finish is marred by buffing, with most of the wax adhering to the buffing brush or cloth. However, if evaporation is too rapid, the formation of a crystalline coating rather than the desired amorphous mass is encouraged with attendant waste of wax and loss of lustre and protection for the finish.

Accordingly, the principal object of this invention is the provision of a self-sprayable non-aqueous aerosol wax polish composition capable of practical use in conjunction with automatic, cyclically operated vending machines for dispensing of shoe shines.

A further object of this invention is to provide a non-aqueous aerosol spray wax shoe polish composition which is "instant-dry," is non-flammable; is buffable to a hard, high-lustre finish; is chemicaly compatible with the liquefied propellant gas under pressure; is non-clogging relative an aerosol spray valve; is non-injurious to leather surfaces; is dispersible in liquefied propellant gas as a fine suspension; is free from the tendency to agglomerate to a degree interfering with spraying; and is free of emulsifying agents, surface active agents, and other non-wax components which may accumulate as a residue on the treated surface to result in an unsatisfactory shine finish.

Another object of this invention is to provide a non-aqueous sprayable aerosol wax polish composition comprising a wax-chlorinated hydrocarbon solution dispersed in a liquefied dichlorodifluoromethane propellant (Freon® 12).

A still other object of this invention is the provision of a non-aqueous aerosol wax polish composition incorporating a dye component; said dye component remaining non-crystalline during application of the composition to a surface as well as during the rapid evaporation of solvents and propellant from the treated surface, said dye component comprising a dye solution which is dissolved in wax concentrate solution, later to be dispersed in the propellant carrier in accordance with the invention.

Other objects and advantages of the invention are directed to a novel method of making an aerosol wax polish composition comprising the steps of first making a solution of wax and dye in a chlorinated hydrocarbon solvent as a concentrate and, thereafter adding the concentrate to a liquefied propellant carrier, under pressure, to form a fine suspension of wax-dye-solvent in the carrier. Additional objects and advantages of the invention will occur to those skilled in this art in which several examples of compositions in accordance with the invention are set forth so that one may advantageously practice the invention.

The aerosol spray wax shoe polish composition according to the invention comprises a non-aqueous suspension of a wax concentrate solution dispersed in a liquefied propellant carrier under pressure, the relative amounts of concentrate and propellant carrier ranging from about 35% concentrate 65% carrier mixture to about 65% concentrate 35% carrier mixture. The wax concentrate solution, according to the invention, comprises a mixture of solution of a wax derivative and a de-oiled lanolin composition dissolved in a chlorinated hydrocarbon solvent. A dye component may be present in the concentrate solution and a perfume likewise may be included to mask the solvent odor.

The principal wax component, utilized in accordance with the invention, is of the montan type, and is a naturally occurring wax derived from lignite coal and esterified with glycols. This wax is similar to carnauba wax in hardness and penetration characteristics. The selected wax, known as "F" wax, has a drop point and melting point of 162–171° F., a congealing point of 154–162° F.; a softening point of 154° F., an acid number of 6–10, and a saponification number of 95 to 105. The "F" wax is light yellow in color and has a hardness penetration of less than 1, using a petrometer and utilizing the smallest cone with widest angle. While other montan waxes may be utilized to result in an operable composition, "F" wax produces the best results. Use of the other montan waxes would result in a much softer finish, more easily striated by brushing. Other montan type waxes include "OP" wax, which is a paste forming wax, also esterified but combined with calcium and so-called "V" and "W" waxes. This "F" wax is available commercially from American Hoescht Corporation (Hostachem Div.). The invention does not exclude presence of minor quantities of carnauba wax and, in fact, tolerates same for adjustments of hardness of the resulting coating.

According to the invention, the montan wax ("F" wax), is mixed with a second component known as "de-oiled lanolin" and sold under the registered trademark "Lanocerin" by Robinson-Wagner Company, Inc. of Mamaroneck, N.Y., U.S.A. The "Lanocerin" (T.M.) is described as "de-oiled lanolin" since it conforms with most of the USP specifications for lanolin except that its main distinction is its melting point due to the removal of the liquid esters; the substance being a hydrophilic, waxy ester fraction isolated from pure lanolin. Since this "Lanocerin" (T.M.) material is composed of fatty acid esters of monohydric alcohols, it is considered a true wax, being amorphous and one of the softest, most plastic natural waxes available. The material discussed has the following physical specifications provided by the manufacturer:

Color—ASTM 3 maximum
Melting point—41° to 51° C.
Sapon. value—85 to 115
Iodine value (Hanus)—15 to 30
Acid value—2.5 maximum
Loss on drying—0.25 maximum
Residue on ignition—0.1% maximum In the composition of the invention, an unusually large quantity of the lanolin derivative relative to the wax component, about of the order from 1:3 to 2:5, is used. The lanolin derivative is utilized as a "glossing" agent to prevent powdering of the coated montan wax instead of its known use as an emulsifying agent. It must be stressed that the composition according to the invention is not an emulsion.

The choice of chlorinated hydrocarbons instead of other solvents for the wax, is critical, with 1,1,1 trichloroethane being preferred. Trichloroethylene as well as a mixture of 1,1,1 trichloroethane and dichloromethane are preferred substitutes. Other chlorinated solvents may be utilized with due caution being taken against distasteful odors, toxicity, flammability, etc. Solvents such as mineral spirits, alcohols are undesirable due to the "wetness" of the sprayed coating, as well as flammability, toxicity and other characteristics.

The dye component is selected to be soluble in waxes and hydrocarbons and insoluble in water. A brown colored or a black colored aniline type dye being characterized by such solubility characteristics may be used with advantage, same each being organic dyestuffs, with the brown dye being a mixture of at least two separate dyes. The identity of the individual components of these dyes generally is characterized by the art by reference to their Color Index Reference Number as listed by the American Association of Textile Chemists and Colorists, in the United States, and the Royal Society of Textile Chemists and Colorists, in Great Britain. The preferred dye compositions are identified as follows:

Black:                                                               Color Index
    Solvi-Sol$_{TM}$ Jet Black Extra #7 _____ 50415B
Brown:
    Solvi-Sol$_{TM}$ Dark Brown, blend of—
        Solvent Yellow 14 _____ 12055
        Solvent Yellow 56 _____ 11021
        Solvent Black 7 _____ 50415B
        Solvent Red 27 _____ 26125
        Solvent Orange 7 _____ 12140

Available from Keystone Analine and Chemical Company, Inc., 321 N. Loomis St., Chicago, Ill.

By the method of the invention, the solution of wax concentrate first is prepared. A selected quantity of the "F" montan wax and a selected quantity of the lanolin derivative, "Lanocerin" is added to a large container and heated to about 120° F. so as to melt the wax-lanolin mixture. A small quantity of chlorinated hydrocarbon solvent, 1,1,1 trichloroethane, is added rapidly to the melt with attendant agitation. A second quantity of solvent then is added to form a clear amber colored solution. Thereafter, further addition of solven occurs to bring the total solvent present to the desired amount.

A dye solution is formulated by mixing a base dye with 1,1,1 trichloroethane in quantities to form a 2% by weight solution. The dye solution is filtered, additional solvent being added to return the solution to 2% value. The dye solution is added to the concentrate as part of the solvent addition, but only subsequent to filtration of said dye solution.

Any solvent lost during the formulation stage, as by evaporation, can be added to assure the proper desired concentration.

The wax concentrate is cooled and mixed with the liquefied propellant under pressure and packaged in aerosol containers in accordance with conventional aerosol filling techniques so that the preferred concentration may range from about 65% concentrate to 35% propellant to about 35% concentrate to 65% propellant.

Attention must be directed to absence of emulsifiers and/or of surface active agents. As well, no organo-silicone derivatives or other silicones are utilized. Note, too, that the concentrate solution is a non-aqueous one.

As will be fully appreciated from the discussion of the ingredients which may be used in the formulation of the aerosol wax compositions in accordance with this invention, a range of formulations may be used in the preparation of polishes, and, the proportions of the ingredients can be varied. Thus, I have found that one may vary the composition of the wax polish concentrate within the following ranges:

| Ingredient: | Range of concentration, percent by weight |
|---|---|
| Wax | About 1.0 to about 2.0. |
| Lanocerin® | About 0.4 to about 0.75. |
| Dye | About 0.1 to about 0.3. |
| Chlorothene® (Registered trademark, Dow Corning Corporation, Midland, Mich.) | About 96 to about 98. |

A perfume may be added, if desired, to a percentage similar to dye.

Specific embodiments of the aerosol spray wax polish composition in accordance with the invention, which are particularly adapted for use as a shoe polish utilizable in an automatic, preprogrammed shoe shine machine are illustrated by the examples which follow.

EXAMPLE I

Aerosol can fill: Percent by weight
Wax polish concentrate _____ 60
Dichlorodifluoromethane (Freon® 12) _____ 40

| Concentrate | Percent by weight | For 175 lb. batch lot |
|---|---|---|
| "F" Wax | 1.23 | 2.5 |
| Lanocerin® | 0.462 | 0.808 |
| Percent dye solution | 0.123 | 0.215 |
| Perfume | 0.123 | 0.215 |
| Chlorothene® | 98.062 | 171.608 |

The poundage of "Chlorothene" used includes 10.535 lbs. of "Chlorothene" used in preparation of the 2% dye solution.

EXAMPLE II

Aerosol can fill: Percent by weight
Wax polish concentrate _____ 40
Dichlorodifluoromethane (Freon® 12) _____ 60
Wax polish concentrate: Percent by weight, about
"F" Wax _____ 2.0
Lanocerin® _____ 0.75
2% dye solution _____ 0.20
Chlorothene® _____ 97

EXAMPLE III

Aerosol can fill: Percent by weight
Wax polish concentrate _____ 65
Dichlorodifluoromethane (Freon® 12) _____ 35
Wax polish concentrate:
"F" Wax _____ 1.2
Lanocerin® _____ 0.46
Dye _____ 0.12
Chlorothene® _____ 98

Reference is made to the technical literature for further description of the so-called "de-oiled lanolin" sold under the trademark Lanocerin, the montan type waxes and their derivation from lignite coal. Particularly, reference is made to "Product Bulletin No. 31" issued Aug. 1, 1962 and revised October 1966 by Robinson-Wagner Company, Inc. of Mamaroneck, N.Y.; to the Technical Service Bulletin, No. TS-2-66 of the American Hoechst Corporation, Hostachem Div., Mountainside, N.J., containing specification data on the "F," "OP," "V" and "W" waxes mentioned above; to a brochure published by and available from Farbwerke Hoechst A.G., Post Box 95, Gersthofen, 8900 Augsburg 2, entitled "Hoechst Waxes—General"; and to pages 461 to 463 inclusive from the publication entitled "Chemistry and Technology of Waxes, 2nd Edition" written by Albin Warth in 1956; published by Reinhold Publishing Corp.

While the aerosol wax shoe polish composition, in accordance with the invention, and the method by which it is produced, have been specifically exemplified in the foregoing, it will be understood that these examples are for the purpose of illustration and that modifications and changes can be made from these examples without departing from the spirit and scope of the following claims.

What it is desired to be obtained by Letters Patent of the United States is:

1. A non-aqueous aerosol wax polish composition comprising a suspension of a wax concentrate in a liquefied propellant gas carrier under pressure, said wax concentrate consisting of a wax and de-oiled lanolin dissolved in a chlorinated hydrocarbon solvent in which the wax is present in a range from approximately 3 parts wax to 1 part de-oiled lanolin to 5 parts wax to approximately 2 parts de-oiled lanolin, respectively, and said wax concentrate is suspended in said liquefied propellant gas carrier in a concentration ranging from about 35% of concentrate to 65% concentrate, by weight.

2. The composition as claimed in claim 1 further comprising a solution of an organic dyestuff in a chlorinated hydrocarbon solvent.

3. The composition as claimed in claim 2 wherein the organic dyestuff is present in said wax concentrate as a 2% by weight solution in a chlorinated hydrocarbon solvent and in an amount sufficient to produce from about 0.12% to 0.3% by weight of organic dyestuff based on the wax concentrate.

4. A method of producing an aerosol wax composition containing a suspension of a wax concentrate in a liquefied propellant gas carrier, said wax concentrate consisting of a mixture of wax and de-oiled lanolin dissolved in a chlorinated hydrocarbon solvent and a prefiltered organic solution of a dyestuff, wherein the wax is present in a range from approximately 3 parts wax to 1 part de-oiled lanolin and the organic solution of dyestuff is present in an amount sufficient to produce a dyestuff concentration of from about 0.12% to 0.3% by weight based on the wax concentrate; the steps comprising:

(1) melting the wax-de-oiled lanolin mixture,
(2) adding stepwise the chlorinated hydrocarbon solvent and the prefiltered solution of organic dyestuff with agitation, and thereafter
(3) dispersing said wax concentrate in a liquefied gaseous propellant in an amount sufficient to produce an aerosol wax polish composition having from about 35% wax concentrate and 65% propellant to from about 65% wax concentrate and 35% propellant, by weight, the above process being conducted so that sufficient organic solvent is added to replace the solvent loss by evaporation during agitation.

References Cited

UNITED STATES PATENTS

| | | | |
|---|---|---|---|
| 2,681,859 | 6/1954 | Wenaas | 106—10 |
| 2,846,321 | 8/1958 | Wenaas et al. | 106—10 |
| 2,902,376 | 9/1959 | Beacher et al. | 106—10 |
| 2,907,664 | 10/1959 | Schoenholz et al. | 106—10 |

OTHER REFERENCES

Herzka, A.: The Behavior of Lanolin Derivatives in Pressurized Formulations II. In J. Soc. Cosmetic Chemists, 16, pp. 31–38, 1965.

JULIUS FROME, Primary Examiner

J. B. EVANS, Assistant Examiner

U.S. Cl. X.R.

106—10, 11, 268, 271; 117—142; 252—857, 15, 305